U S009299027B2

United States Patent
Smith et al.

(10) Patent No.: US 9,299,027 B2
(45) Date of Patent: Mar. 29, 2016

(54) SYSTEM AND METHOD FOR PROVIDING INTELLIGENT LOCATION INFORMATION

(71) Applicant: Runway 20, Inc., Los Altos Hills, CA (US)

(72) Inventors: Lucas O'Neil Smith, Atlanta, GA (US); Oliver Clark Rickard, Pacifica, CA (US); Thomas William Moulia, Pacifica, CA (US); William Christian Ferrell, Los Altos Hills, CA (US)

(73) Assignee: Runaway 20, Inc., Palo Alto, CA (US)

( * ) Notice: Subject to any disclaimer, the term of this patent is extended or adjusted under 35 U.S.C. 154(b) by 320 days.

(21) Appl. No.: 13/838,103

(22) Filed: Mar. 15, 2013

(65) Prior Publication Data

US 2013/0297551 A1 Nov. 7, 2013

Related U.S. Application Data

(60) Provisional application No. 61/643,761, filed on May 7, 2012.

(51) Int. Cl.
*G06N 5/02* (2006.01)
*G06N 3/02* (2006.01)
*H04L 12/58* (2006.01)

(52) U.S. Cl.
CPC .. *G06N 5/02* (2013.01); *G06N 3/02* (2013.01); *H04L 51/20* (2013.01)

(58) Field of Classification Search
None
See application file for complete search history.

(56) References Cited

U.S. PATENT DOCUMENTS

| 2009/0005077 A1 | 1/2009 | Forstall et al. |
| 2009/0089803 A1 | 4/2009 | Biggs |
| 2010/0004997 A1 | 1/2010 | Mehta et al. |
| 2011/0125545 A1 | 5/2011 | Lehmann et al. |
| 2011/0301841 A1 | 12/2011 | Schuurbiers et al. |

FOREIGN PATENT DOCUMENTS

WO 2011150971 A 12/2011

OTHER PUBLICATIONS

Fithian et al., The Design and Evaluation of a Mobile Location-Aware Handheld Event Planner. Mobile HCI 2003, LNCS 2795, pp. 145-160 [online], [retrieved on Mar. 22, 2015]. Retrieved from the Internet:<URL: http://www.google.com/url?sa=t&rct=j&q=&esrc=s&frm=1 &source=web&cd=1&cad=rja&uact=8&ved=0CB8QFjAA&url=http%3A%2F%2Flink.springer.com>.*

* cited by examiner

*Primary Examiner* — Stanley K Hill
*Assistant Examiner* — Nathan Brown, Jr.
(74) *Attorney, Agent, or Firm* — Jeffrey Schox; Thomas Gwinn

(57) ABSTRACT

A method and system that includes extracting event models from at least one personal planning source of a user, wherein a parameter of an event model includes event location; periodically receiving location information of at least one mobile device of the user; storing the location information in a location log; a pattern worker module maintaining user location patterns through the location log; generating a location prediction from the extracted event models and the user location patterns; a first content worker module checking if the location prediction meets a set of content requirements; if the set of content requirements is satisfied, initiating content retrieval from at least one service; and pushing the content to the mobile device.

20 Claims, 15 Drawing Sheets

SYSTEM AND METHOD FOR PROVIDING INTELLIGENT LOCATION INFORMATION

CROSS-REFERENCE TO RELATED APPLICATIONS

This application claims the benefit of U.S. Provisional Application Ser. No. 61/643,761, filed on May 7, 2012, which is incorporated in its entirety by this reference.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Providing Intelligent Location Information

Figure 1:
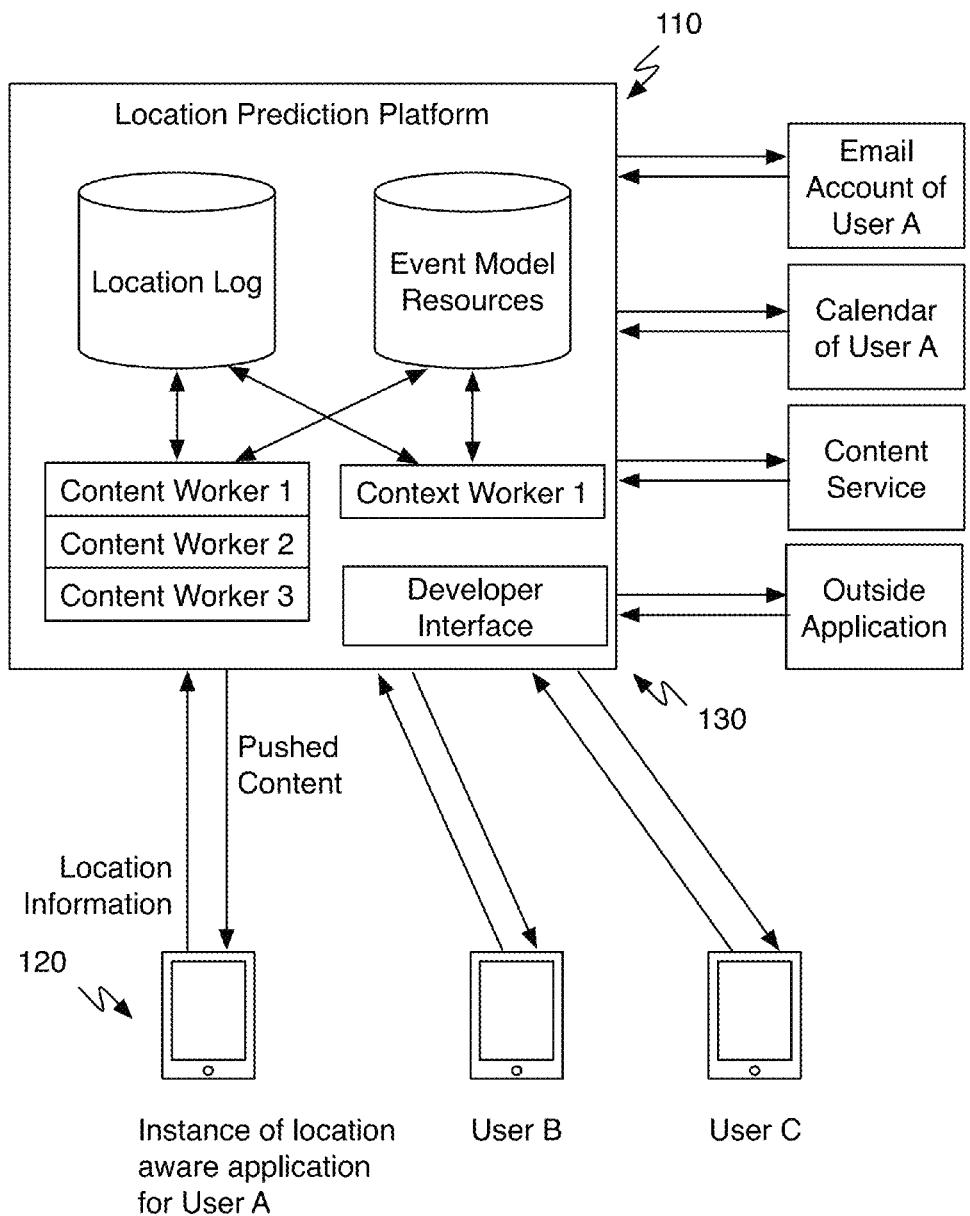
FIG. 1 is a schematic representation of a system of a preferred embodiment.

As shown in FIG. 1, a system for providing intelligent location information includes a location prediction platform 110, a location aware application 120, and a developer interface 130 to the location prediction platform 110. The system functions to provide predictive intelligence for mobile devices. A mobile device application that leverages the predictive intelligence generated in the system can be used to display information alerts (e.g., weather, traffic, parking, restaurant, and other information), provide contextually appropriate interactions at an appropriate time, trigger application actions, intelligently complete transactions based on location and travel routes, trigger physical interactions (e.g., turn on/off lights, a vehicle, heater/air-conditioning system, etc.), and/or perform other actions in response to and in anticipation of a user's location and the context of that location. The system can migrate a substantial portion of the location intelligence to server side components, which function to leverage the data and centralized access point to a plurality of mobile devices. The location prediction platform can be a multi-tenant platform that manages the intelligent location information for numerous users, while the users can receive contextual information and interactive content through an application operable on a mobile device.

Figure 2:
FIG. 2 is an exemplary screenshot of generated content for an upcoming flight.
Figure 3:
FIG. 3 is an exemplary screenshot of generated content with a boarding pass for an upcoming flight.
Figure 4:
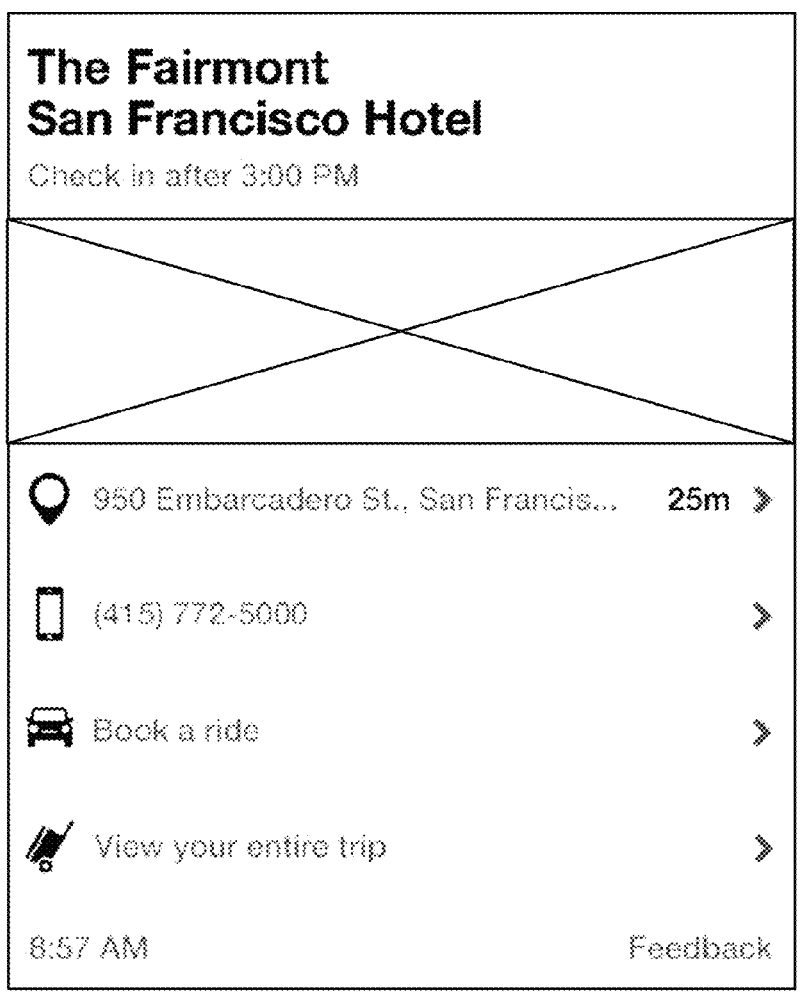
FIG. 4 is an exemplary screenshot of generated content for an upcoming trip to a hotel.

From a user perspective, the system can act as an intelligent personal assistant that anticipates actions and needs of the user and intelligently provides useful information and interactions at the proper time. As opposed to always reacting to user prompts or saturating the user with information, the system can be used to intelligently bring relevant information to the attention of the user at a contextually appropriate time. In one implementation, the system can be used to provide an array of useful services. The system can target flight information that is extracted from email and/or calendar data of a user. The day before a flight, the application can alert the user of the upcoming flight, provide any related information such as flight delays or destination weather, and provide an interactive interface to book a ride to the airport or check-in to the flight, as shown in FIG. 2. As the user arrives at the airport for a planned flight, the application can load a copy of the flight tickets, as shown in FIG. 3. The system can additionally target hotels, as shown in FIG. 4, car rentals, restaurant reservations, movie showings, music and performance events, and other planned events in a similar manner.

Figure 5:
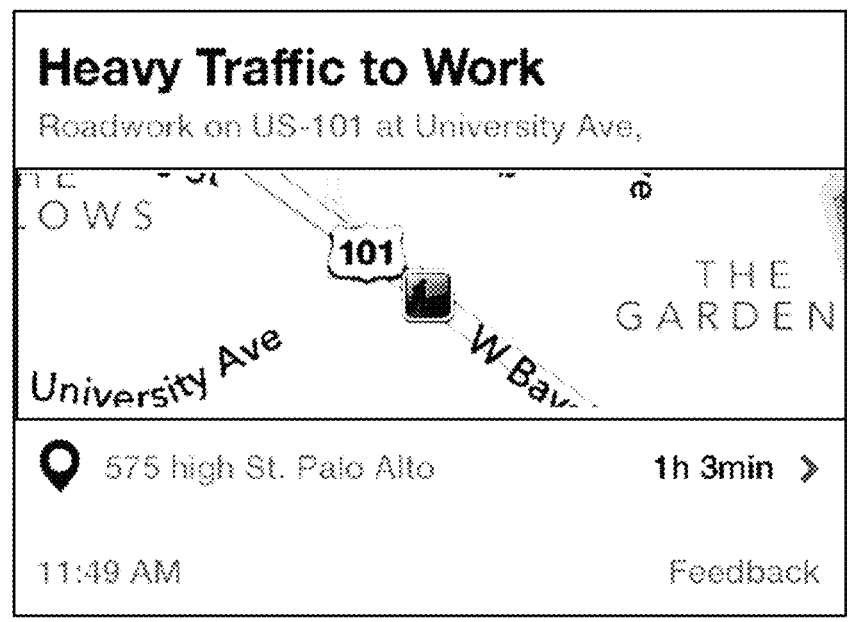
FIG. 5 is an exemplary screenshot of generated content for travel information when leaving for work.
Figure 6A:
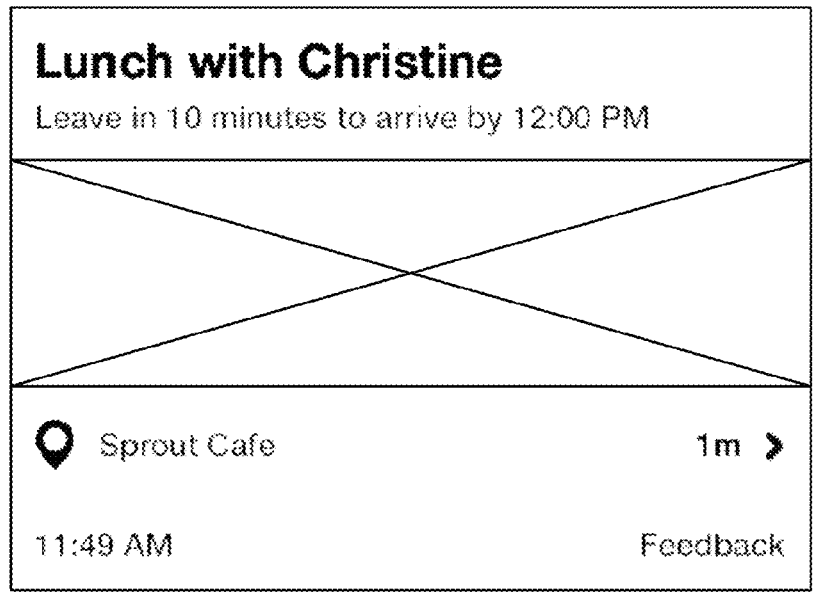
FIGS. 6A-6C are exemplary screenshots of generated content to remind a user of a planned event.
Figure 6B:
Figure 6C:
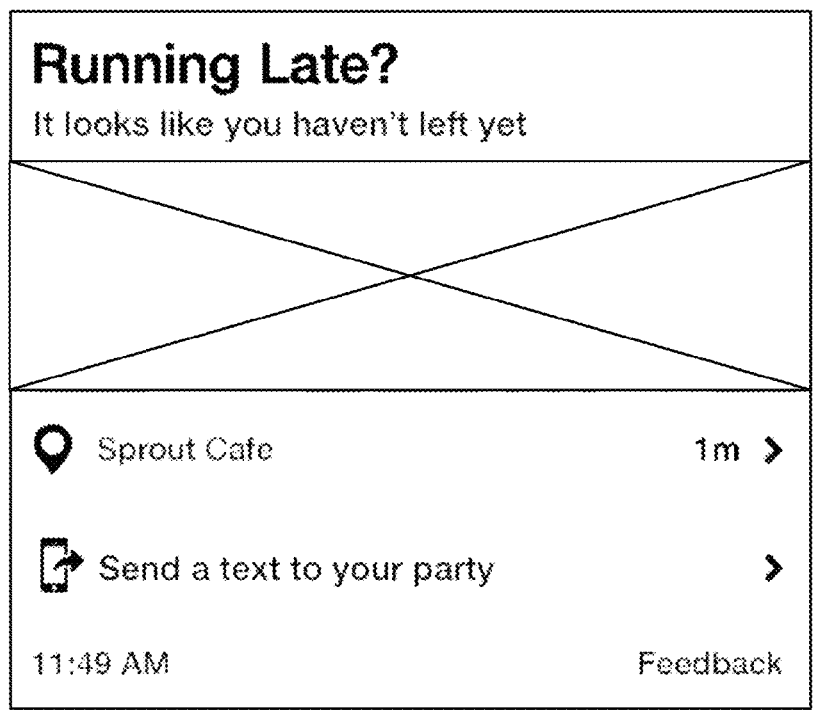
Figure 7:
FIG. 7 is an exemplary screenshot of generated content for weather based on location prediction of a user.

The system can additionally target more routine activities, such as travel to and from work. The system preferably builds intelligence around a user's varying schedule and provides information at appropriate times. When a user leaves home to go to work, the application can display an alert with travel information for the route to work, as shown in FIG. 5. The application can also push content based on events planned in a personal planning data source (e.g., email account, personal calendar, account on a booking website, social network event, etc.). An initial message can be pushed to the user to remind the user of a planned event, as shown in FIG. 6A. The system can additionally push a reminder when the user should leave for the planned event (if the user has not left already) based on the location of the planned event (i.e., the predicted location of the user at the time of the event) and the current location of the user, as shown in FIG. 6B. Additionally, the system can selectively send other escalating content such as another reminder, as shown in FIG. 6C, a functional interface to notify the other participants that the user is running late, or any suitable escalating notification. The application may additionally or alternatively provide the weather for where the user is traveling at a time when the user is anticipated to leave or is detected to leave, as shown in FIG. 7. Knowing that it is raining at the user's destination when the user arrives does not help the user plan for the rain, but by notifying the user of the prediction of rain around the time the user will leave can give the user enough time to grab an umbrella or rain jacket. The application can additionally use the contextual categorization of the locations visited by a user. For example, if the user is going to work, the application can notify the user of work meetings and tasks for when the user arrives. If the user is going home around dinner time, the application can notify the user of a recipe or restaurant suggestions or TV shows on that evening.

When the location prediction platform is configured with an outside developer/application interface, the application of the system can be further integrated into a wider variety of applications enabled through the supplemental information and capabilities of the outside application. The system can benefit from the capability of anonymizing/abstracting location information and categorizing it into information that can provide interactions that in raw location format would otherwise raise privacy concerns. Applications and various services can build interactions around contextual location scenarios such as "leaving home", leaving work", "arriving home", "arriving at work", "leaving for event X", "catching a flight", "landed in City Y", and/or any suitable location based context. This alleviates third party applications from building the infrastructure to detect and identify relevant events, and it further alleviates users from sharing private information, such as the geographic coordinates of the users home, to numerous applications wishing to use that information. Third party applications can use such information to trigger application and/or device events, provide application or service specific information, and/or perform location predictive transactions. Third parties can trigger application specific actions or activate devices. For example, house lights and/or heating/air-conditioning systems can activate when a user is heading home. Applications can use the platform to push their own data to users. For example, a taxi/car share application can push a time estimate and capability to order a ride in time for a user leaving for a predicted destination. A third party can additionally integrate with the platform to initialize and complete transactions. For example, a coffee shop can enable the capability to automatically order a user's preferred drink when they are predicted to go to the shop. As a further example, a user can input that they want a ride to the airport, and a taxi application and the platform preferably cooperatively order a taxi and have the taxi arrive at the user's current location when they need to leave for the airport.

The location prediction platform 110 of the preferred embodiment functions to be a remote system that manages, calculates, and initiates the prediction for location interactions of the system. The location prediction platform 110 is preferably operable on an internet accessible server, and more preferably, the location predictive platform is operable within an infrastructure of a server system hosted on a cloud hosting environment, distributed computing system, a computer cluster, or any suitable internet service/application infrastructure. The location prediction platform 110 preferably includes an account database, a location log, a plurality of location service worker modules, and other suitable components to support implementation of the location prediction platform no. The location prediction platform 110 is preferably a multi-tenant platform, and the location prediction platform no preferably serves the multiple users (i.e., device applications of users) on shared resources. The location log preferably stores a log of location updates transmitted to the location prediction platform no from the location aware applications 120. Preferably, a location log is used to store the log of location information for all users. Alternatively, a location log can be maintained separately for substantially each user account.

Figure 8:
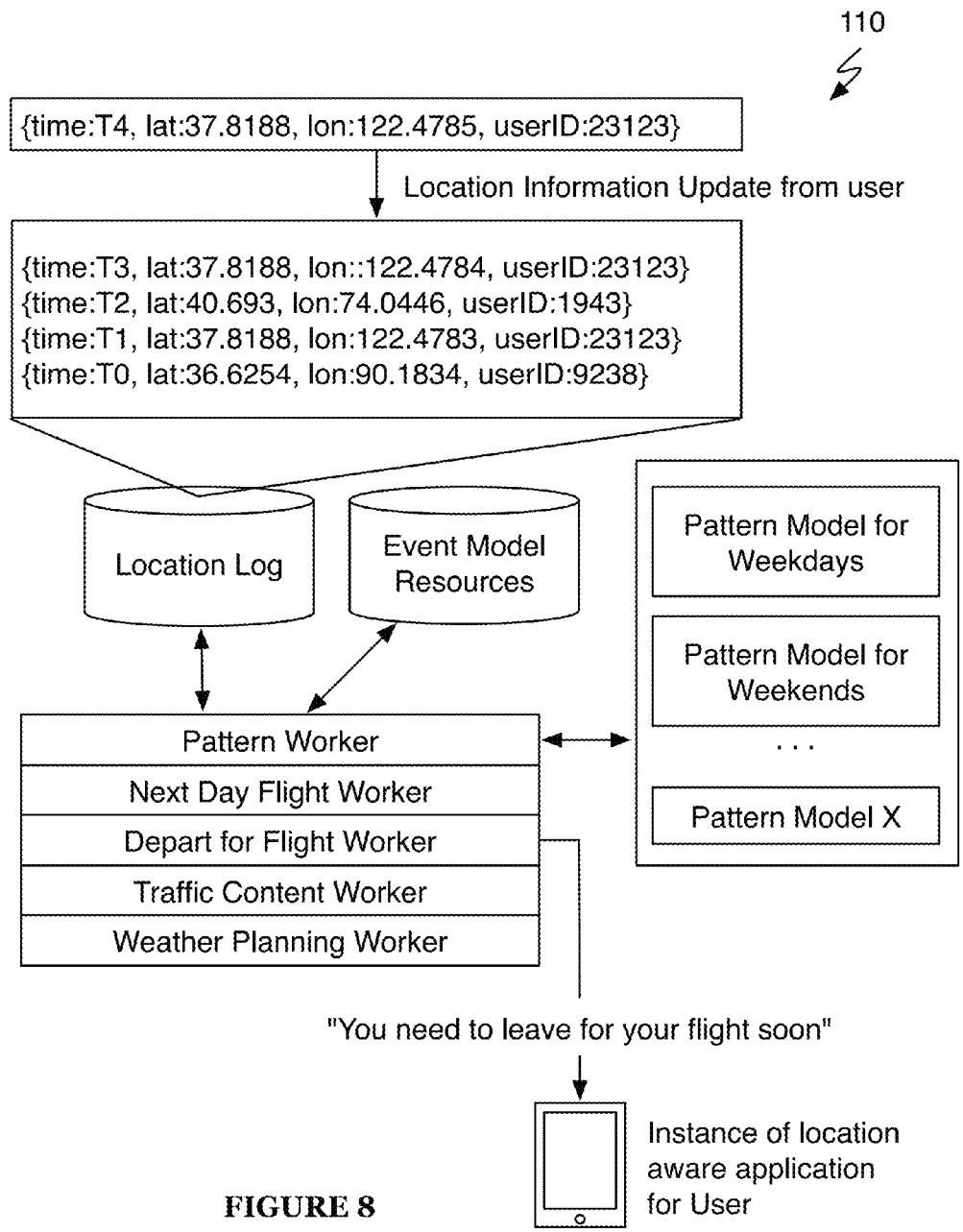
FIG. 8 is a detailed schematic representation of components of a location prediction platform of a preferred embodiment.

As shown in FIG. 8, the location service worker modules are routines, scripts, processes, or other operational modules that act and service various operations of the service. A location service worker module (referred to as a "worker module", or simply "worker") function to perform at least one specialized task. The location service worker modules preferably work off of updates to the location log. Each worker module can user various heuristics to generate data, predict location information, push content to a user, or facilitate operations of the system in any suitable manner. There are at least three types of location service worker modules: a pattern worker module that maintains location patterns of a user, a content worker module that determines conditions and content to send to a device, and a context worker module that detects particular events and scenarios to alert outside entities. A plurality of worker modules can be used to provide a variety of different capabilities to the system.

A departure worker module uses the current or most recent location information and predicted location (e.g., predicted from calendar or email data) to determine when a user should leave to arrive at a predicted location at a scheduled time. A late worker module can perform a similar calculation, but the heuristic-based logic of the second worker module is customized to push a notification to a user when the user will be late for a predicted event.

Flight worker modules can specialize in flight-based features. One flight worker module can identify flight information from a personal planning data source (e.g., email or a calendar) and display the flight information to the user to reinforce that the system has captured that event. Another flight worker module can push flight information and possible flight related interactions to the mobile device when the flight is approaching (e.g., the day before the flight). Another flight worker module can use current device location and/or the user's trip to the airport to trigger display of information that the user will need in the hours preceding the flight (e.g., gate information, a digital copy of the flight, parking information etc.).

Hotel worker modules can perform similar services for hotel bookings. Rental car worker modules can perform services for car rentals that are similar to the flight worker modules. Other alternative implementations can have worker modules for movie ticket sales, restaurant reservations, music venue tickets, business meetings, social parties (e.g., birthday parties, bridal showers, weddings, baby showers, retirement parties, holiday parties, etc.).

A weather worker module can include heuristic-based logic to use the predicted location of a user to push a weather report for the destination when the user is expected to leave. Another weather worker module can perform a similar service by pushing weather updates for the current location in the upcoming time (e.g., a notification that it may start raining in the next ten minutes). Weekend and workweek weather worker modules can provide weather report notifications for a user's expected locations for the work week and the weekend. The workweek weather worker module preferably notifies the user on Sunday, and the weekend weather worker module preferably notifies the user on Friday or Thursday.

A traffic worker module can provide traffic notifications based on predicted locations. The traffic worker module preferably determines a route to the predicted location, a current location of a user, and any travel route patterns. The predicted route can be used to provide traffic news that may impact the trip to the user. The timing of the traffic notifications can be configured to account for delays that the traffic would cause the user. Additionally, a traffic updater worker module can conditionally provide updates on the traffic if a traffic notification has been pushed to the application and there has been an update in the traffic condition.

An internet-enabled device worker module can trigger actions in a registered device based on the location prediction. For example, an internet-enabled device worker module can turn on the house lights of a user when the user is arriving at home and turn off the house lights when the user is leaving for work.

A planning worker module preferably ingests location information from the location log to generate location pattern predictions. Location pattern predictions are preferably location patterns such as times and days of the week when the user is at home, work, school, the gym, or other locations. The patterns also characterize when a user will leave a location and which location they will be going to next. The modeling of the patterns preferably relies on a plurality of pattern models. A pattern model is preferably an algorithmic model that predicts location based on past location information. A pattern model may be geared to a specific type of pattern such as time frame or location type. The pattern models are preferably Markov chains, but alternatively a pattern model may be a neural network, a statistical model, machine learning approach, or any suitable pattern model. In one preferred implementation, each Markov chain is preferably targeted at different time frames. For example, one Markov chain can characterize patterns in workday schedules and a more specialized Markov chain can characterize patterns for Thursday, which could accurately predict location even if the Thursday schedule for the user is different from the other workdays. A location categorizing worker module can function to map locations with names, labels, or categorization.

The location categorization worker module can use content that is used to predict a location in order to apply a categorization, label, and/or name. Preferably, the location categorizing worker module can determine work and home and can be capable of generating personalized categorizations/labels such "Matt's house", "Angela's work", "my gym", and the like. Furthermore, the location categorization worker module can update the categorization if the categorization changes (e.g., if the user changes place of employment, the work label can automatically change). An event worker module can be configured to identify particular events such as "leaving work", "leaving home", "arriving at work", "arriving home", "going grocery shopping", and other event types. The events are preferably transitional events that signal a time and location parameter. The time parameter preferably indicates if the user is traveling to the location, returning from that location, or in progress of being at that location.

The location aware application 120 of the preferred embodiment functions to provide an operable component on a mobile device. The location aware application 120 is preferably a downloadable application that can be installed on a mobile device. The location aware application may alternatively be a web application with access to location information of the device, a background service, a service of the operating system, and/or any suitable operable component on a device. The mobile device is preferably smart phone, a tablet, a wearable computing device, a handheld gaming system, a car or vehicle computer system, a laptop computer, and/or any suitable device. The mobile device is preferably one that often accompanies the user. The location patterns of the device are preferably assumed to substantially match those of the user. If the mobile device is nearly always in the vicinity of the user (e.g., a mobile phone), then location prediction can be applied to a wide variety of applications. If the mobile device is only in the vicinity of the user for portions of the user's routine, then the system can provide more targeted location prediction according to the nature of that device.

The location aware application preferably transmits location information of the device to the location prediction platform 110. The location information is preferably in the form of latitude and longitude coordinates. The location information is preferably retrieved from a location service of the device, which can use GPS, IP location information, cellular triangulation, and/or any suitable geographic location detection technique. The location aware application preferably intelligently uses the location services of the device in a manner to reduce energy use, which promotes longer battery life. The location information is preferably periodically updated, but based on the predicted locations and times, the application can schedule polling of location services to reduce the polling. Additionally, the location services can be polled less frequently if the location aware application detects a stationary location for a sustained period of time. For example, if a user is at work, the location aware application 120 can pole location every 30 minutes if the user has been at work for an hour and they usually work nine hours.

The location aware application 120 additionally includes a user interface that is used to render content pushed to the location aware application 120 from the location prediction platform 110. The location aware application 120 can use any suitable interface, but a stream of content is one preferred variation for how to present content to the user in a timely and contextually sensitive manner. The location aware application 120 additionally can communicate with outside services or apply processing logic to generate the appropriate content based on instructions from the location prediction platform 110. In one variation, the location prediction platform no can generate the content and transmit the content to the location aware application 120 to display to the user. In another variation, the location prediction platform no can determine the parameters of the content (e.g., content type and location information) and transmit a notification to the location aware application 120 with the content parameters. The location aware application 120 then preferably generates and retrieves any additional information based on the parameters of the content notification.

The developer interface 130 of the preferred embodiment functions to provide a way for outside developers to integrate functionality and data from the location prediction platform no into their applications or services. The developer interface 130 is preferably an application programming interface (API), but the developer interface 130 may alternatively be a plug-in engine, where developers can integrate customized logic instructions to impact operation of the location prediction platform no and/or the location aware applications 120. Preferably, a user will grant an outside application permission to access location information. The location information available to the outside application can be abstracted or limited to any set of location categorizations, location contexts, or other suitable conditions. Once permissions are granted, the outside application can preferably receive or retrieve location information relating to the user. The outside applications may use the developer interface 130 to enable a variety of location-based functionality. Additionally, the developer interface 130 may include a capability for the outside application to supply content that is pushed from the location prediction platform no to the location aware application 120.

2. Method for Providing Intelligent Location Information

Figure 9:
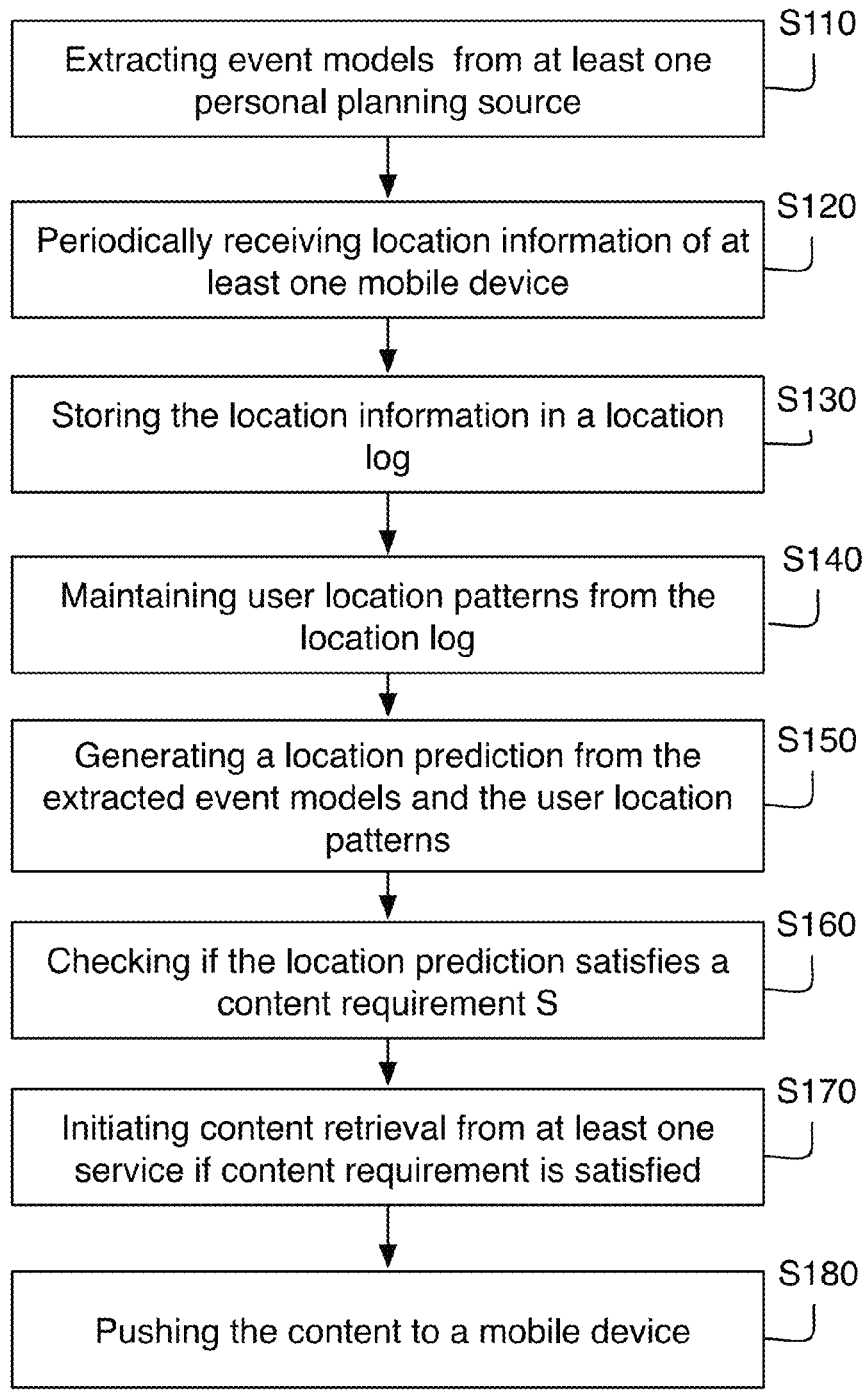
FIG. 9 is a flowchart representation of a method of a preferred embodiment.
Figure 10:
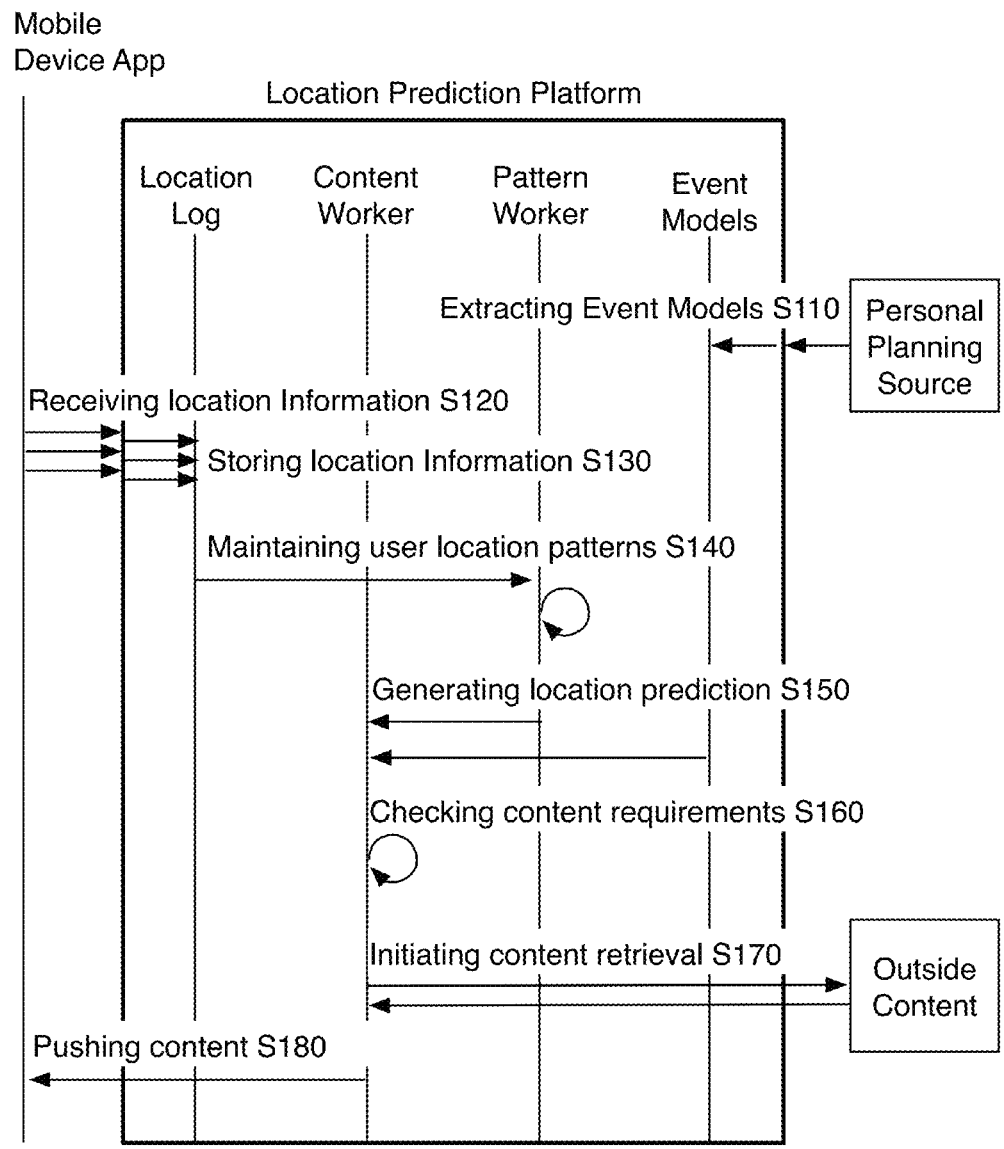
FIG. 10 is a sequence diagram representation of a method of a preferred embodiment.

As shown in FIG. 9, a method for providing intelligent location information includes extracting event models from at least one personal planning source, wherein a parameter of an event model includes an event location S110; periodically receiving location information of at least one mobile device S120; storing the location information in a location log S130; with an application worker module, maintaining user location patterns from the location log S140; generating a location prediction from the extracted event models and the user location patterns S150; with an application worker module, checking if the location prediction satisfies a content requirement S160; if content requirement is satisfied, initiating content retrieval from at least one service S170; and pushing the content to a mobile device S180. The method functions to use a combination of location prediction signals to provide appropriate content to a user at the time and place where the content will be useful. The method is preferably implemented in a location prediction platform such as the one described above and as shown in FIG. 10. Content is preferably pushed to a location aware application that is operable on a mobile device. Alternatively, the location prediction platform and the location aware application can cooperatively generate and notify a user of relevant content. Alternatively, the method may be implemented on any suitable system. In one preferred implementation of the method, a user benefits from the method by being notified of weather, traffic, reservation details and related services (e.g., flight, car, hotel, restaurant, etc.), meetings, and other information.

Block S110, which includes extracting event models from at least one personal planning source, functions to process data that relates to scheduled events of the user. An event model can be any suitable characterization of an event. Preferably, extracting an event model includes determining a location of the event, a time of the event, and/or a title or description of the event. Additionally, the event model can include participants of the event, a categorization of the event, related documents, related websites, and/or any additional information for the event. The personal planning source can be any suitable resource with information on activities, events, or meetings. A calendar application/service, an email account, a social network (e.g., with event planning features), a text message log, or any suitable personal planning data source. A user can be requested to authenticate or authorize access to the personal planning data source. A script or software module preferably accesses, processes, and identifies events from the personal planning data source. Any suitable natural language processing, data scraping, and/or event heuristics may be used to identify an event and extract parameters that characterize the event. Event model data is preferably stored for a user so that the data may be accessed and used when identifying various content conditions.

Block S120, which includes periodically receiving location information of at least one mobile device, functions to update the location prediction platform with the location of a device. The location information preferably includes absolute geographic location such as longitude and latitude, but may additionally include altitude and other specifications for geographic location. The location information may additionally include a location abstraction. A location abstraction is preferably a higher order name for a location such as a human-defined name for the location. The location abstraction may include a street address, a building name, a business name, location type, location categorization, and/or a user specific label. The received location information may additionally be used to generate or retrieve additional location information such as querying a location service to identify the location abstraction for a particular longitude and latitude. The location information is preferably sent by a location aware application operable on a mobile device of a user. The location prediction platform preferably receives location information updates for a plurality of different users. The location information updates are preferably spaced according to the change in location of the mobile device. If the user is traveling or frequently moving, the application of the mobile device preferably transmits more frequent location information updates (and the updates are correspondingly received at the location prediction platform in a similar frequency). If the user is stationary and the mobile device is reporting small changes in location, the application of the mobile device can decrease the frequency of the location updates, which can help to conserve energy use on the device. The location aware application can determine the frequency of the updates. Alternatively or additionally, the location prediction platform can request location updates from the location aware application at appropriate times. The location prediction platform will preferably have location predictions modeled for a given user, and can use those to schedule when location updates should be acquired. For example, the location prediction platform predicts that the user will be in a meeting for an hour, the location aware application will preferably be notified to not send location updates until substantially near the end of the meeting. The location information updates may alternatively be routinely scheduled or use any suitable heuristic for sending of the location updates.

Block S130, which includes storing the location information in a location log, functions to maintain a history of location data. Preferably, a database is used for storing location information for a plurality of users. In one variation, the location log uses the time of the location information as a key and stores the latitude and longitude data along with an account identifier. An application worker module of the location prediction platform preferably actively works on recent updates to the location log. When new location information is generated, an application worker module preferably begins to process the information. A subset of application worker modules may additionally be configured to work on new data of the location log in a set sequence. The method may alternatively be implemented without persistently storing the location information, but instead temporarily storing the information to process the new location information.

Block S140, which includes an application worker module maintaining user location patterns from the location log, functions to determine location patterns of a user. A pattern worker module of the location prediction platform preferably continuously updates location patterns for new location information. Maintaining user location patterns preferably includes generating predictions from location history stored in the location log. Maintaining a user location pattern preferably includes implementing an algorithmic pattern model. In one variation, Markov chains are used to generate location predictions based on location history, but the pattern model(s) may alternatively be a neural network, a statistical model, a machine learning approach, or any suitable pattern modeling approach. Preferably, a set of Markov chains is maintained to predict the likelihood of moving another location based on the current location. Of the set of Markov chains, there are preferably at least two Markov chains for different time frames. For example, there can be a Markov chain maintained for location patterns for the workweek, weekends, and each day of the week. Markov chains can additionally target other scenarios such as particular locations (e.g., patterns for the San Francisco area versus patterns in Los Angeles), special occasions or holidays, patterns tied to particular personal events, or for any suitable segment of location patterns. The appropriate Markov chains are preferably updated to reflect new data in the location log, which functions to constantly evolve the Markov chains. The Markov chains can additionally only use location data over a specified time frame to determine the model, which would enable the Markov chains to update to reflect current patterns if the location patterns of a user changes. The pattern model preferably uses absolute location information (e.g., longitude or latitude), but the pattern models may additionally or alternatively work on location real-world names, categorization, or type. A set of pattern models may be geared towards specific types of locations such as grocery stores, gas stations, restaurants, shops, and the like. For example, the pattern model may use the business name of a coffee shop as a location in addition to or as an alternative to the specific geographic location. The patterns then can be based on general location patterns. For example, a user's routine of going to the same coffee shop company each morning regardless of what city may then predict next location of the user in a new city. Similar to how pattern models may be may be maintained for particular use-cases, scenarios, and contexts (e.g., different time frames), pattern models may additionally be maintained for particular locations. For example, a pattern model for stores when visiting a mall or shopping center may be maintained so that the system can predict the next store the user will likely visit.

Block S150, which includes generating a location prediction from the extracted event models and the user location patterns, functions to predict a location for a user. The prediction is preferably for the next significant location. A significant location is preferably distinguished from a transitory location in that the significant location is where a user will spend some time often for some activity. A plurality of location predictions can additionally be made. The location predictions may be for various times throughout the day, week, or month. Preferably, the location prediction is a combination of data from the maintained location patterns and the extracted event models. Locations of event models preferably represent high probability locations. The likelihood of an event model location can be further increased by extracting or receiving confirmation that the user plans to attend the event. In one variation, when an event is extracted, the event information can be pushed to the location aware application, and a user can confirm or cancel the event. The location patterns are preferably also used, but can be weighted, scored or given lower priority to confirmed events. The set of Markov chains are preferably used to predict a location based on a user's location patterns. Preferably, the set of Markov chains are processed in combination, and depending on the scenario, the Markov chains predictions can be weighted. For example, on Mondays a Markov chain specific for Mondays is preferably given more weight than a Markov chain maintained for Tuesday patterns and even a Markov chain for workdays. Some heuristical logic can additionally be used to determine the likelihood of the location. For example, if a user confirms a meeting in New York, but the user is located in San Francisco 30 minutes before the meeting, the confirmed event is preferably weighted to indicate the low likelihood of that location.

Block S160, which includes a content worker module checking if the location prediction satisfies a content requirement, functions to determine if content should be delivered for the current scenario. Content requirements can include conditions based on the user's current location, the predicted location, properties of the predicted location (e.g., is there traffic), properties of the route from the current location to the predicted location, relative aspects of the two locations (e.g., time to travel between the two locations, is the weather significantly different, etc.), the time of the prediction, state of the application or the user account (e.g., has related content been pushed to the user). One preferred content condition may be a condition of the current time being an expected departure time to travel to the next predicted location. The departure time is preferably based on expected travel time between the predicted location and the current location of the mobile device. The current location is preferably the most recently received location information of the user stored in the location log. In this variation, an outside mapping or travel time estimation service may be queried. Other outside sources may additionally be queried such as weather services, traffic services, airport delay services, user accounts on various web portals, or any outside data source. Content requirements are preferably set for a variety of types of content. The requirements are customized so that meaningful and timely information and interactions are delivered to the user according to the context. If the user is about to leave for work, the traffic to work may be displayed. If the user had a flight the next day, the flight information and the weather in the destination city for the duration of the trip may be displayed. Preferably there is a plurality of worker modules that check various content requirements. The various worker modules can include flight worker modules, hotel worker modules, rental car worker modules, reservation worker modules, weather worker modules, traffic worker modules, internet-connected device worker modules, and/or suitable types of worker modules.

Blocks S170 and S180, which include if the content requirement is satisfied, initiating content retrieval from at least one service and pushing the content to a mobile device, functions to trigger the display of content on the mobile device of the user. In one variation, the content can be generated server-side (at the location prediction platform). The content or at least a portion of the content may alternatively be retrieved or generated at the location aware application. Some content and/or interactions can use services provided through an API of an outside vendor. As will be described below, a third party developer can use the API of the location prediction platform to push his own content to the location aware application. In one variation, the content is a push notification with text and/or media. In another variation, the content is eventually rendered in the location aware application as an information view, and optionally an interactive view. Preferably the content is displayed in the stream of the location aware application. The information preferably includes related content. Additionally, interactions and services can be accessible through the view. The content pushed to the mobile device or location aware application preferably includes user interface elements pre-configured to include location parameters in an interaction with an outside service. For example, content for the airport can include a button to order a taxi. The button can be preconfigured to specify the location and destination of the user when requesting a ride from the taxi service. Thus one-click or context aware interactions can be integrated into the content. The content is preferably transmitted automatically and without necessitating input from the user.

The method of the preferred embodiment can additionally include applying user categorization to a location S190, which functions to identify and use user understandable names for locations. The categorization of a location preferably applies some form of user understandable location abstraction. Location abstraction can identify a street address, a building name, a business name, location type, location categorization, and/or a user specific label. User specific labels preferably include location categorizations such as "home", "work", "school", "parent's house", "Angela's work", "my gym", and the like. The user categorization of a location is preferably applied based on extracted events models from the personal planning source. Natural learning processing and other content processing techniques can be used to extract terms, labels, and/or categorization that are used by the user (and associated users) to refer to a location. Preferably, a mapping between a location categorization and a geographic location can be found in one piece of content of the personal planning source. For example, an email from a user may state "Meet me at my office located at 123 Example Street San Francisco". The address and the user's label for the location ("office") may be extracted from this content. Location categorization may additionally include the combination of personal planning data sources and location history (i.e., the location information stored in the location log). If a similar email is processed that states, "Meet me at my office at 3 pm", and at 3 pm of the corresponding day the user is at a particular location, then that is preferably used as a signal that the particular location is the user's office. Additionally, such inference of location categorization can be completed without accessing a personal planning source of the user. Some location categorization can occur based upon the location patterns of a user. For example, where the user spends his or her time during business hours is preferably assigned a "work" location categorization, and where the user spends his or her nighttime and weekend time is preferably assigned a "home" location categorization. Location categorization can additionally leverage the multitenant nature of the location prediction platform to use the location categorizations of a plurality of users to determine categorization of a location.

3. Alternative Method for Providing Intelligent Location Information

Figure 11:
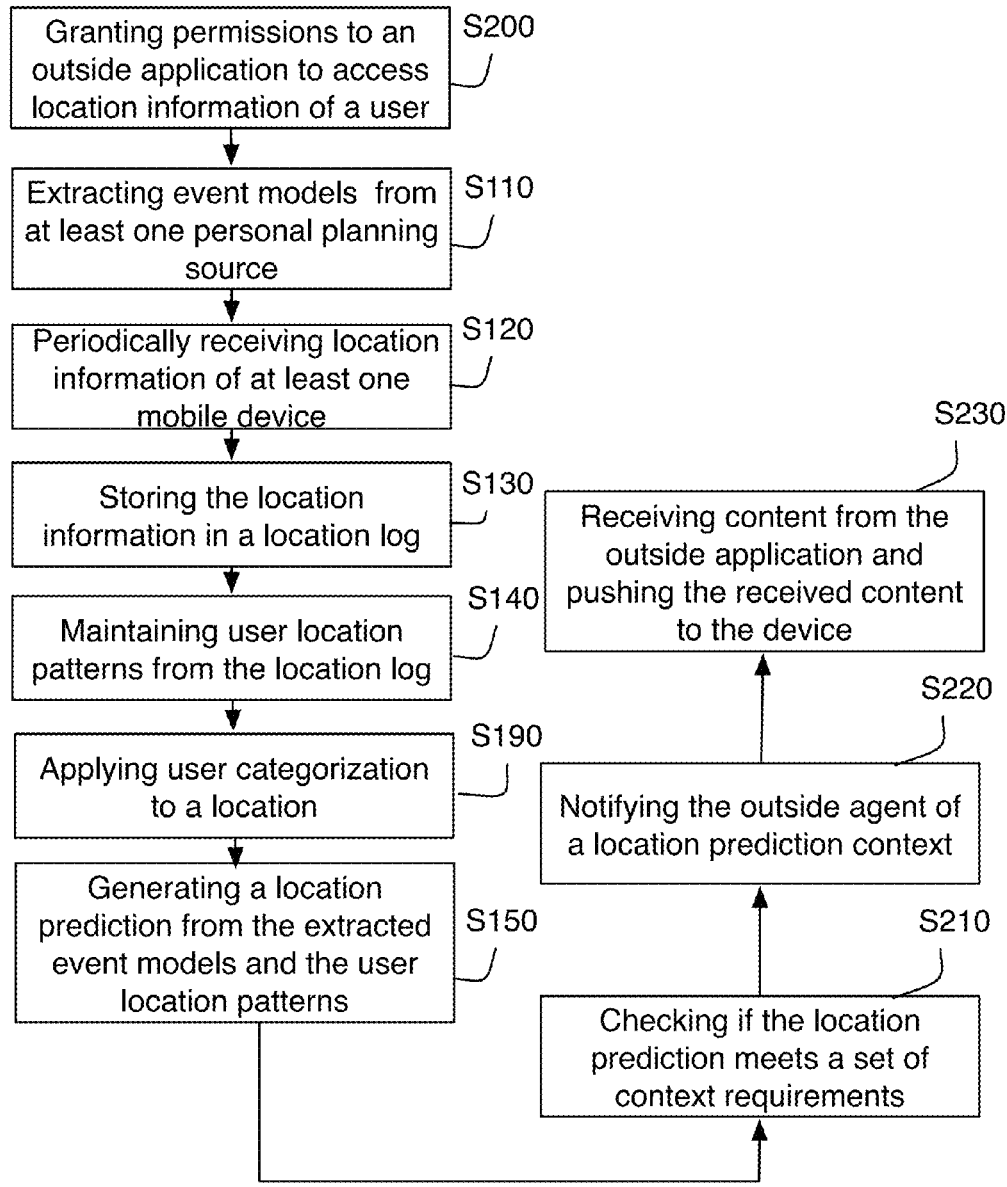
FIG. 11 is a flowchart representation of a variation of the method of a preferred embodiment for enabling platform use by third party applications and services.
Figure 12:
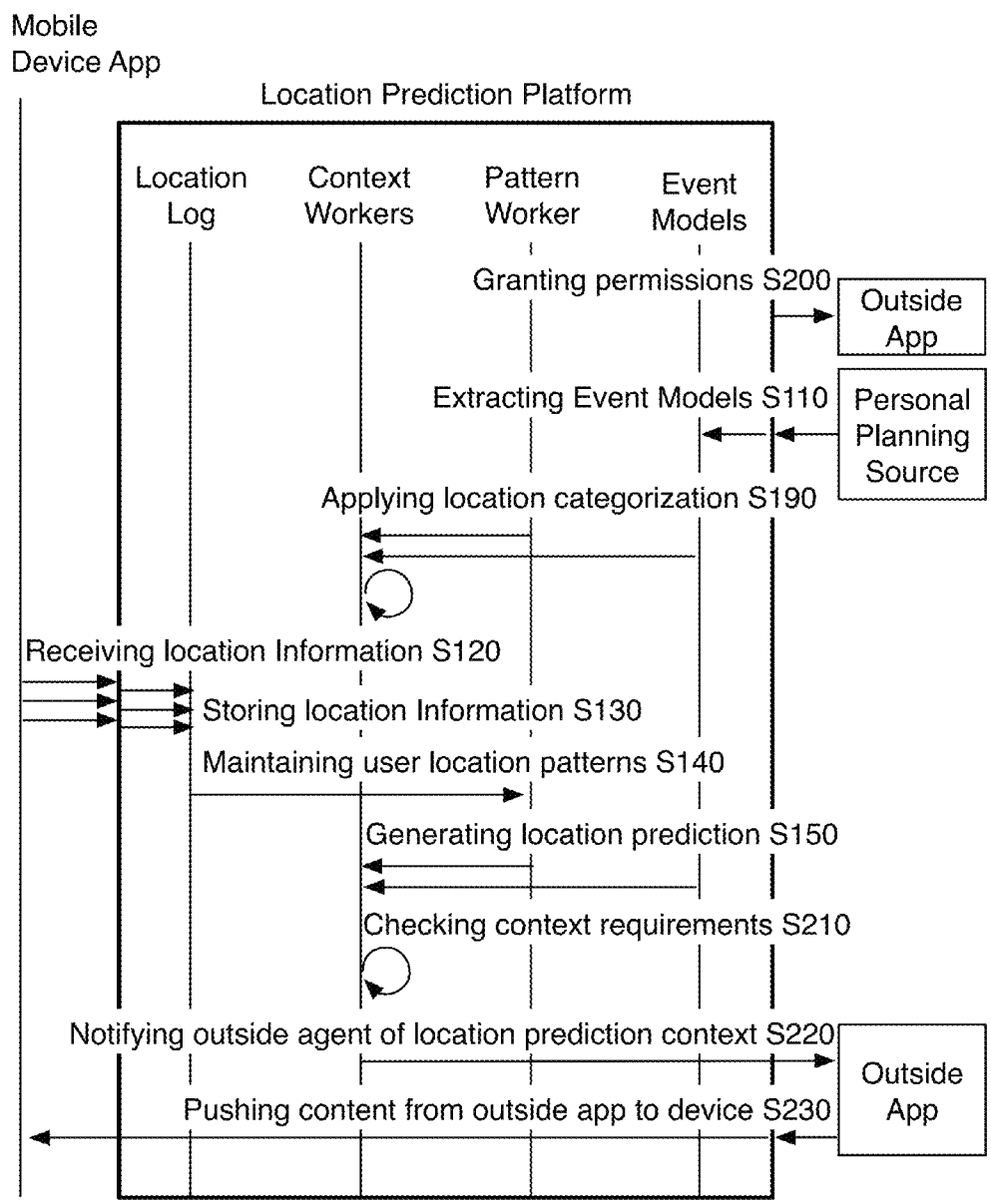
FIG. 12 is a sequence diagram representation of a platform variation of the method of a preferred embodiment.

Additionally or alternatively, the method of the preferred embodiment can include granting permissions to an outside application to access location information of a user S200; a context worker module checking if the location prediction meets a set of context requirements S210; and if the set of context requirements is satisfied notifying the outside agent of a location prediction context S220, as shown in FIG. 11. These additional or alternative steps function to enable a location prediction platform. As the location prediction platform is hosted server side, the location information is readily accessible for outside applications and services. The platform variation is preferably implemented on a location prediction platform substantially similar as described above and as shown in FIG. 12. An application programming interface (API) or other suitable developer interface such as a developer admin portal is preferably provided to enable developers to easily integrate the functionality of their application and services with the location information of the location prediction platform. The location prediction capabilities can additionally be used to inform applications and services of a user's expected locations. Furthermore, when used in combination with the location categorization capabilities of the method, location abstraction can provide a way for users to obtain location-enabled applications and services without revealing detailed geographical information to applications. For example, instead of knowing the home of a user is located at a specific longitude and latitude, the outside application can only be notified of the "home" categorization and optionally the approximate geographic location (e.g., San Francisco).

Block S200, which includes granting permissions to an outside application to access location information of a user, functions to authorize an entity to access and interact with the location information of a user. Granting permissions preferably includes authenticating the identity of a user, specifying/setting the permissions outside application, and then receiving confirmation from the user to grant the permissions to the outside application. The granting of permissions can use an authorization process such as an open standard for authorization (e.g., oauth) or any suitable authorization process. The user can additionally be asked to authenticate with the outside application if, for example, the outside application depends on user data. The permissions for the location information can specify the granularity of the location information and/or particular contexts that the application can access. The granularity of the location can enable location information with latitude and longitude information, approximate location information (e.g., 1 mile radius, city, state or country), specific location names (e.g., business names or site names), and/or location categorization (e.g., "home", "work" or "school"). The permissions may be for particular sets of location information. A set of location information may limit access to location information to a particular chain of businesses, types of locations (e.g., grocery stores), regions of a location (e.g., a park, inside a mall, a city, etc.), and other restricted sets of locations. Contexts can be specific scenarios such as leaving from a location, departing for a location, arriving at a location, staying at a location, will be in a location at a particular time (e.g., this afternoon, tomorrow, this week, etc.), or any suitable context scenario involving user location. For example, an application for a grocery store can only be granted access to location information and be alerted of location contexts for "leaving for grocery store". The permissions can include any additional or alternative features to customize the privacy and access to the location information of the user.

Blocks S210 and S220, which include a context worker module checking if the location prediction meets a set of context requirements and if the set of context requirements is satisfied, notifying the outside agent of a location prediction context, functions to send location information updates to the outside application. Blocks S200 and S210 can function substantially similar to Blocks S160 and S170, except in that the context worker modules can trigger the delivery of location information (in a raw and/or abstraction format) to an outside entity rather than a mobile device. The location information and contextual description is preferably sent to the outside application without retrieving content from an outside source as in Step S170. The context worker modules preferably function to identify particular location prediction scenarios or contexts such as "leaving work", "heading home", "heading to X location", or "arriving at X location". In a variation, the location prediction platform can be queried by an application or regular updates from the platform on the location can be transmitted to the outside application without requiring the detection of a context scenario. The location information in a response to a query is preferably abstracted to the location abstraction level specified in the permissions granted to the outside application.

The platform variation of the method of the preferred embodiment can additionally include receiving content from the outside application and pushing the received content to the location aware application S230, which functions to provide a seamless way for application and service developers to integrate customized content into a location based personal assistant application such as the location aware application. The content is preferably pushed to the location aware application in a manner substantially similar to the content pushed in Block S180. The content from the outside application can preferably provide any suitable information, layout, interfaces, interactions, and other content elements. The content preferably conforms to a standard content format or specifications. In one implementation, the content from the outside application is preferably displayed in a stream of the location aware application in a manner consistent with the content pushed as a result of content worker modules of the location prediction platform. The location aware application is preferably an application provided by the entity hosting and operating the location prediction platform.

The platform variations of the method of the preferred embodiment can have various applications. As mentioned, the platform enables multiple applications and services to use and/or integrate with the location information and content of the location prediction platform. The outside applications preferably can use the platform aspects in at least two manners. The first use of the outside application is to provide content to the location aware application. As mentioned above, Block S230 enables applications and services to generate customized content that can be delivered to users. Content from outside developers is preferably dependent on similar conditions as the content initiated by content worker modules, and so the applications can deliver content in a similarly relevant and timely manner. Users will preferably selectively add various services (and grant permission to outside applications) from the location aware application to subscribe or signup for specialized content that is provided from outside applications.

A second use of the outside application is to trigger events. The outside application can use the location information for a variety of internal uses such as logging events, triggering actions, pushing content to a mobile application of that outside application developer, or any suitable response of the outside application. For example, a life logging application can track the time a user spends at work, at home, and traveling. In one variation, the outside application can be a service controlling at least one internet connected device of the user. For example, the outside application can use the location information of the location prediction platform to turn on/off house lights; start, turn on, heat, or move a vehicle; augment an air-conditioning or heating system of a house; activate a cooking device; and/or augment the behavior of any suitable device. Furthermore, the outside application can trigger transactions based on predicted location. For example, public transportation or taxis can be automatically paid (and optionally notified of a ride request) based on a user's location prediction and expected context (e.g., needs ride to location X). In another example, a coffee shop can enable a user to configure an account so that whenever the user is predicted to go to a favorite coffee shop of the user, a favorite drink is ordered and purchased. The user can simply walk to the coffee shop and pick up their automatically purchased and ordered coffee. Such applications and use cases enabled by outside applications can additionally be enabled and configured for a content worker module of the location prediction platform.

4. Exemplary Implementations

The system and methods of preferred embodiments can be implemented to provide a variety of contextual location-based services. In preferred implementations, a user will preferably download an application that is taking advantage of the method or participating in the execution of the described methods. The application can be configured for receiving and interacting with a variety of predictive location content, but the application may alternatively be a third party application that is using the API of a location prediction platform. One preferred application of the contextual location-based services of the system and method is in the field of travel and more particularly flights, as described in the following exemplary implementations.

Figure 13:
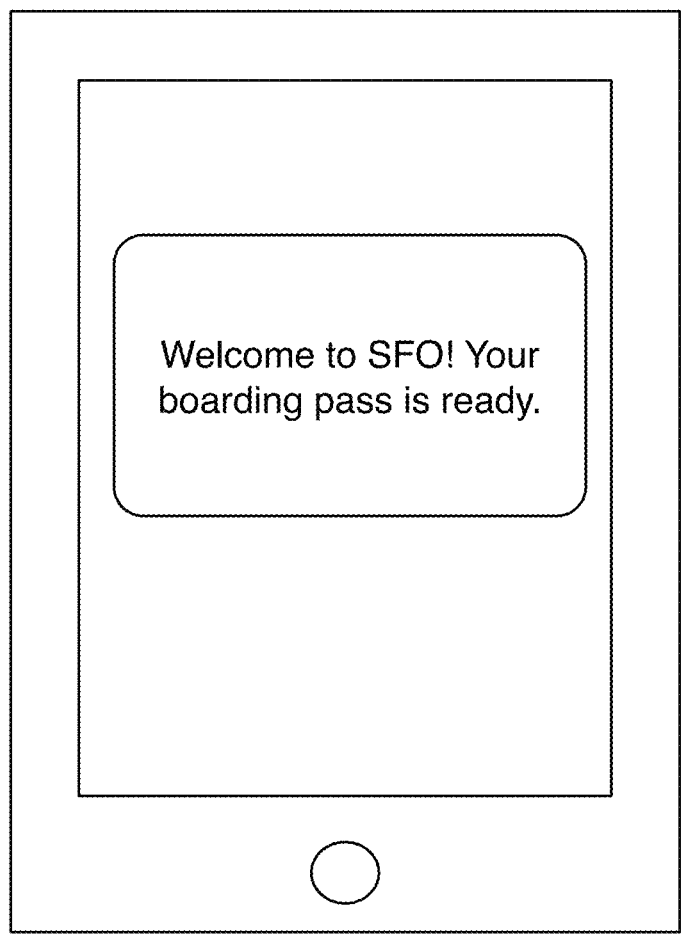
FIGS. 13 and 14 are exemplary schematic representations of notifications pushed to a mobile device.
Figure 14:
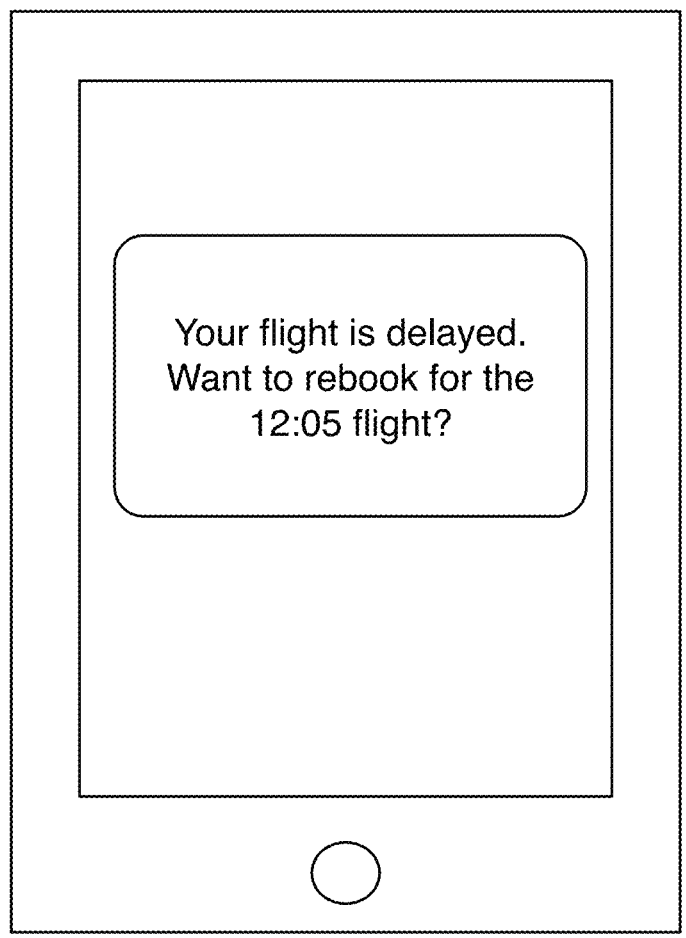

In an exemplary implementation, user flight information, including airline, flight number, departure time, and departure and arrival locations, can be automatically accessed and extracted from booking data (i.e., a personal planning data source). Message content based on a worker module of the location prediction platform is preferably generated that includes the travel detail based upon user data and travel data. User data can include location, travel history, purchase history, demographic information, or flight/travel preference, and any travel data, such as related to an airport, a particular flight, a particular aircraft, or travel to and from the airport, can inform the message. A worker module of the location prediction platform preferably determines a substantially optimal time to transmit the travel detail to the user based upon the user data (e.g., the location patterns of the user and location information in the location log) and the travel data (e.g., event models). The message content is preferably transmitted so that the message content is timely and substantially immediately relevant to the user. The message content is preferably transmitted automatically and without necessitating input from the user. Generally, the message content is preferably transmitted to the user at the time determined. However, duplicates of the message can also be sent subsequently. For example, duplicate messages can be sent if the user does not positively indicate that he has read the message, such as by clicking an "Accept" or "OK" field after a previous message was sent. The message content is preferably sent in the form of a notification to a mobile electronic device of the user, such as a personal or company cellular phone as shown in FIGS. 13 and 14. However, the message can be sent in the form of an email, a calendar alert, an automated phone call or voicemail, a SMS text message, or any other suitable form of communication. In one variation, the message content is rendered as content in the steam of a location aware application. The message can additionally or alternatively be accessible by the user from any of a smart phone, a tablet, a desktop or laptop computer, or any other suitable mobile or static electronic device.

In one variation, the message content includes information relevant to the user several hours or days before a scheduled departure. In one example, the message content includes a reminder that the user has a flight the subsequent day. In this example, the message content can further include a travel itinerary, such as airline, flight number, the departure and destination cities or airports, and the departure terminal and/or gate. The message content preferably reflects the systems understanding of the next task of the user and includes related information in the message content. Furthermore, in this example, the optimal time to push the message to the user, as determined by a content worker module, can be user-specific. For example, the message can be sent to the user when the user is known to be free or not in a meeting, when the user is home and has time to pack, when the user is near a vendor, or when the user is with a friend (e.g., so he is reminded to request a ride to the airport).

In another exemplary implementation, the message content includes the weather forecast at the destination location over the entire anticipated stay of the user and can also include the forecast for the departure (and return) location on the anticipated day of departure (and return). The message content can further include suggestions for clothes to pack, such as a coat for expected cold weather (based upon forecast) or a swimsuit (based upon forecast, destination location, and/or amenities provided at a hotel booked by the user). In another example, the message content can include a suggestion for a camera for the destination location that is scenic, toiletries for an extended trip, a book that can be completed on the flight or over the course of the trip, a backup laptop battery for a long flight, a translator 'app' for a Smartphone for a trip in a foreign country, an international calling plan, travel insurance, or any other product or service that should be purchased before departure or that would benefit the user while at the airport awaiting departure, while on the plane, or while in the destination location. In the foregoing example implementation, the determined delivery/push time of the message content (as determined by a content worker module detecting the appropriate time requirements) can be when the user is at or near a grocery or convenience store, is at or near a clothing or apparel store, is shopping online, or is home from work on the night before a flight. Additionally or alternatively, the determined time can be based upon store hours of a particular vendor, outlet, or company, such as a cellular provider, an insurance company, or a Laundromat. The time can additionally or alternatively be based upon a schedule or calendar event of the user prior to departure, such as going to work or picking up children from school, or based upon any other relevant factor. For example the message that suggests purchasing sun screen for a trip to the Bahamas can be pushed to the user when the user is returning from picking up a child from school and will shortly pass a Target, Walgreens, or other grocery store.

In another exemplary implementation, the message content includes information relevant to the user on the day of a scheduled departure. In one example, the message content includes a suggestion to depart for the airport, wherein the message takes the form of an alarm. In this example implementation, the message content is preferably based upon the present location of the user (e.g., as indicated by location service or a GPS module in a mobile electronic device carried by the user) and the departure location that is an airport. In this example, the determined timing of the message is preferably based upon user distance to the airport, flight delays, traffic and weather conditions, public transportation (to the airport) times and delays, current or predicted airport security wait time, anticipated user checked baggage and current or predicted airport baggage check wait time, preset gate wait time, user gate time wait preferences, user travel preferences, preferences or nature of additional users accompanying the user (e.g., children, spouse, friends), historic commute, wait, or travel times or preferences of the user, or any other relevant metric, data, or preference. For example, for the user who preferably or historically arrives at the airport less than an hour before scheduled departure when on travelling alone on business trips, the message timing can account for this preference and leave enough time for the user to reach the gate (e.g., two- to ten-minute gate wait time) before boarding given user distance to the airport, flight delays, traffic and weather conditions, predicted airport security wait time, predicted airport baggage check wait time, and the indicated means of travel to the airport, such as by car, taxi, bus, or train. In another example, for the user who is travelling internationally with a wife and two young children, the message timing can leave ample time for the user to collect his family, to pick up last-minute items, to drive to the airport, to find long-term parking, and to pass customs, and the timing can also allow for at least a one-hour gate wait time to give the user time to regroup or to take care of any last-minute issues. In this example implementation, the message that is a suggestion to depart for the airport can also include a suggestion for a travel method, such as a taxi or rideshare reservation, a train or bus schedule, or confirmation that a friend of family member will or is on his way to pick up the user (e.g., by accessing GPS data of the friend or family member to determine proximity to the user). However, the message can be timed according to any other schema, and the suggestion to leave for the airport can additionally or alternatively be provided the day before the scheduled departure, as in the preceding variation, or at any other time.

In another exemplary implementation, the message content is an alert that a flight was delayed or cancelled. This can also trigger the content that aids in or triggers the act of finding a suitable replacement flight.

In another exemplary implementation, the message content is a boarding pass for the user. In this example, when the user is within a certain distance to, arrives at, or walks into a terminal of the departure airport, such as indicated by a GPS module in a mobile device carried by the user, the location prediction platform generates the message content by pushing user identification information to a commercial airline flight reservation server, thus checking-in the user and pushing message content that includes a digital boarding pass, such as a QR code. In this variation, the timing the message content is preferably associated with the location of the user, wherein the location of the user that is proximal the airport triggers accessing the message that is the boarding pass and initiates presentation of the boarding pass to the user. The digital boarding pass is preferably presented to or accessible by the user through the mobile electronic device carried by the user such that the user can check baggage, pass a security checkpoint, and/or board a plane by presenting the mobile electronic device to an airport official.

In another exemplary implementation, the message content is related to a user wait period within an airport. For example, the message can be the location of a free Wi-Fi hotspot within the airport for the user who is on a business trip, the location of a bookstore within the airport for the user who is an avid reader, the location of a sports bar within the airport for the user who is a sports fan, or the location of a restaurant within or near the airport for the user whose has not eaten or prefers a type of food served in the restaurant. In another example, the message can be the departure gate or a departure gate change. In this example implementation, the timing of the message content is preferably determined based upon the location of the user who is within or proximal an airport terminal, the time of day (e.g., lunch time), an event (e.g., a broadcast sporting event), an anticipated need of the user (e.g., email or internet access), or any other suitable variable or user need.

In any of the foregoing exemplary implementations, the message content can be in the form of or include an advertisement for a product or service, wherein the product or service is selected based upon a known and specific need of the user that is directly related to travel or implied by a travel plan. For example, a clothing item suggested to the user based upon a travel destination (e.g., a swimsuit) can be a clothing item from a particular brand or company that pays for advertising. In another example, a suggestion to depart for an airport can include an advertisement for a private airport limousine service, despite the fact that the user historically regularly drives himself to the airport. In this example, the message can also include a comparison of long-term parking rates and limousine rates to further persuade the user to engage the limousine service. The message content can also or alternatively include an advertisement for a daily deal, coupon, or other product, service, or experience particular to the destination location such that advertisements can be pushed to the user based not only on current user location but also an anticipated future user location. For example, the message can include a discount for lunch at a world-famous pizza place in New York for the user traveling to New York or an advertisement for the San Diego Zoo for the user traveling to San Diego. However, any message containing any other relevant travel-related information can be transmitted to the user in any other way and according to any other timing.

A variation of the exemplary implementation can include transmitting the message to an affiliate of the user. In this variation, the message content includes travel-related information relevant to the affiliate of the user. The affiliate can be a friend, family member, colleague, hired driver, or a person otherwise associated with the user. The user preferably selects the affiliate, through the client-side interface or the application described above, by providing contact information of the affiliate, such as a phone number, an email address, an instant messaging username, or a link to a social network profile. The message that is relevant to the affiliate is preferably transmitted to the affiliate through the contact information provided by the user. The message can be transmitted to the affiliate as a SMS text message, an email, an automated phone call or voicemail message, an instant message, a Facebook wall post, a Twitter message, or any other suitable text-, audio-, or video-based message.

Transmission of the message to the affiliate can be handled by the electronic device of the user, by a remote server of the location prediction platform, by the network, or by any other suitable messaging platform, device, or server. The message can be transmitted to the affiliate automatically, such as given a trigger event or at a time determined by a worker module of the platform. Alternatively, transmission of the message to the affiliate can require manual input from the user that confirms the message. In this alternative, this variation can serve to automatically generate travel-related messages for the user.

In one example of this variation, the message transmitted includes a request, on behalf of the user, for a ride to an airport. In this variation, the affiliate can be any of family member, a friend, a coworker module, a taxi, limousine, or personal driver, a rideshare or rental car server, or any other suitable entity. The affiliate can therefore be automatically notified of a transportation need of the user. In this example implementation, the message is preferably transmitted to the affiliate substantially before the scheduled departure such that the affiliate can plan for and accept the ride request substantially without inconvenience and/or such that an alternative affiliate can be found to drive the user if needed. In this example implementation, the automatic messaging of affiliates can further handle ride requests sent to multiple affiliates, wherein the first accepted ride request triggers cancellation of all other ride requests. Therefore, this variation of the exemplary implementation can function to automatically push a ride request, on behalf of the user, to the affiliate in a timely fashion and manage the ride request for the user and the affiliate. Additionally or alternatively, the message transmitted to the affiliate can be a reminder for the affiliate to drive the user to the airport. In this variation, the message can be transmitted to the affiliate the day before the user is scheduled to depart. Alternatively, the message can be transmitted to the affiliate as an alert to leave, wherein the message accounts for the distance between the affiliate and the user, traffic conditions, preferences of the affiliate, user distance to the airport, flight delays, traffic and weather conditions, current or predicted airport security wait time, anticipated user checked baggage and current or predicted airport baggage check wait time, preset gate wait time, user gate time wait preferences, user travel preferences, preferences or nature of additional users accompanying the user, historic commute, wait, or travel times or preferences of the user, or any other relevant metric, data, or preference.

In another example of this variation, the message transmitted to the affiliate includes a travel update related to an itinerary or travel event of the user. For example, the message can be "Arrived at the airport," "Just passed security," "Reached my gate in time," "Boarding," "About to take off," "Just landed," "Just disembarked—heading to baggage claim," "Baggage just arrived," "Waiting outside of Arrivals at Terminal A," "Flight delayed 30 minutes," "Flight cancelled," or any other relevant travel-related phrase or message. In this variation, the application, network, or remote server handling at least a portion of exemplary system and method implementation preferably accesses any one or more of a GPS module in a mobile electronic device carried by the user, an independent commercial airline booking service or server, an in-house commercial airline booking service or server, a flight schedule service or server, and/or a real-time flight tracking service or server to ascertain a travel event or landmark that informs the message sent to the affiliate. As described above, any of these messages can be automatically transmitted to the affiliate, such as at a time determined by a worker module of the platform, or the message can be automatically generated and only sent to the affiliate given a positive input from the user. In the former example, the message is preferably generated, handled, and transmitted by the remote server or network such that the message can be sent to the affiliate even when a mobile electronic device of the user is off or out of Wi-Fi or cellular range. However, the message can be of any other form or content, handled by any other entity, and transmitted to the affiliate according to any other schema.

Any of the foregoing exemplary variations and implementation details can be applied to other forms of travel, such as travel by train, ship, or bus, wherein any of the aspects of the exemplary implementation can be used to book train, boat, or bus fare and/or to transmit messages to the user and/or affiliate regarding travel on the train, boat, or bus, respectively. However, the first and second preferred methods S100, S200 can be used or implemented in any other way. Additionally or alternatively, any of the foregoing exemplary variations and implementation details can be applied to booking a hotel reservation, booking a rental vehicle, booking a guided tour, making a restaurant reservation, planning a meeting, planning events, organizing a personal calendar, or any suitable application.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the location prediction platform and/or location aware application. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device may alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   extracting event models from at least one personal planning source of a user, wherein a parameter of an event model includes event location;
   periodically receiving location information of at least one mobile device of the user;
   storing the location information in a location log;
   maintaining user location patterns through the location log;
   generating a location prediction from the extracted event models and the user location patterns;
   using a first content worker module, checking if the location prediction meets a set of content requirements;
   if the set of content requirements is satisfied, initiating content retrieval from at least one service; and
   pushing the content to the mobile device, wherein the content pushed to the mobile device includes user interface elements pre-configured to include location parameters in an interaction with an outside service.

2. The method of claim 1, wherein maintaining user location patterns comprises updating a plurality of pattern models that characterizes location patterns.

3. The method of claim 2, wherein at least two pattern models of the plurality of pattern models are Markov chains that are characterized for two different time frames.

4. The method of claim 1, wherein the content condition is a condition of the current time being an expected departure time to travel to the location prediction.

5. The method of claim 1, wherein the expected departure time is based on expected travel time between the location prediction and a current location of the mobile device.

6. The method of claim 1, wherein the at least one personal planning source includes an email account and a calendar application.

7. The method of claim 1, wherein a content scenario is associated with the first content worker module, and the content retrieval is for content associated with the content scenario.

8. The method of claim 7, wherein the content scenario is a flight scenario.

9. The method of claim 7, further comprising a second content worker module checking if the location prediction meets a set of content requirements of the second content worker module.

10. The method of claim 9, wherein the first content worker module is for a traffic content scenario and the second content worker module for a weather content scenario.

11. The method of claim 1, wherein the location log is used to store location information of a plurality of users.

12. The method of claim 1, further comprising granting permissions to an outside application to access location information of the user; a context worker module checking if the location prediction meets a set of context requirements and notifying the outside agent of the location prediction context if the set of context requirements is satisfied.

13. A method comprising:
granting permissions to an outside application to access location information of a user;
at a server of a location prediction platform, periodically receiving location information of at least one mobile device of the user;
storing the location information in a location log of the location prediction platform;
maintaining user location patterns through the location log;
extracting event models from at least one personal planning source of the user, wherein a parameter of an event model includes event location;
generating a location prediction from the extracted event models and the user location patterns;
using a context worker module, checking if the location prediction meets a set of context requirements; and
if the set of context requirements is satisfied, notifying the outside agent of a location prediction context.

14. The method of claim 13, further comprising providing a location aware application; for a set of content worker modules, a content worker module checking if the location prediction meets a set of content requirements and pushing content associated with the content worker module to the mobile device if the set of content requirements is satisfied.

15. The method of claim 14, wherein the location prediction platform is a multitenant platform; and wherein the location information for a plurality of users is kept in the location log.

16. The method of claim 13, further comprising applying a user categorization to a location based on the extracted event models from the at least one personal planning source of the user; and wherein the location prediction context describes the location information using the user categorization of the predicted location.

17. The method of claim 16, wherein granting permissions to an outside application to access location information comprises the granted permissions restricting location information to a set of location categorizations.

18. The method of claim 17, wherein the granted permissions restrict location information to a home categorization and a work categorization.

19. The method of claim 13, further comprising receiving content from he outside application; and pushing the content from the outside application to the mobile device.

20. The method of claim 13, wherein the outside application triggers a state change of a device.

* * * * *